Figures 1, 2:
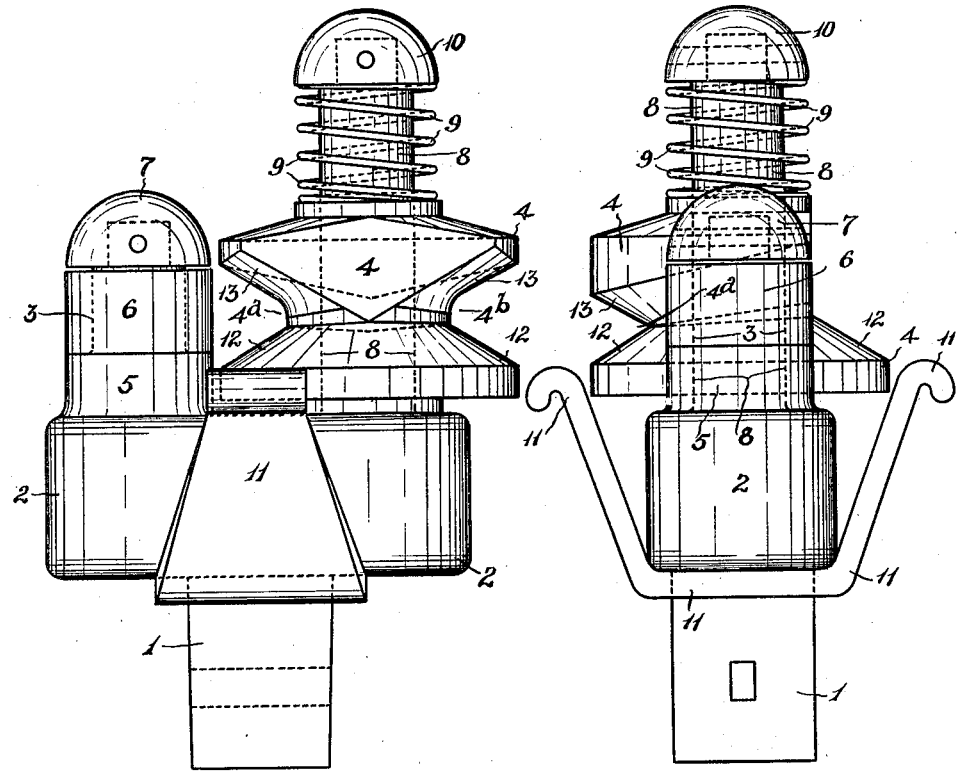

G. T. CANNON.
ROPE GRIP OR JOCKEY FOR MECHANICAL HAULAGE AND THE LIKE.
APPLICATION FILED DEC. 26, 1913.

1,092,137.

Patented Apr. 7, 1914.
2 SHEETS—SHEET 1.

Witnesses:
Chas. Obendale
A. Thompson

Inventor:
George Tom Cannon

G. T. CANNON.
ROPE GRIP OR JOCKEY FOR MECHANICAL HAULAGE AND THE LIKE.
APPLICATION FILED DEC. 26, 1913.

1,092,137.

Patented Apr. 7, 1914.

2 SHEETS—SHEET 2.

Witnesses:
Chas. Ovendale,
A. Thompson

Inventor:
George. Tom Cannon

UNITED STATES PATENT OFFICE.

GEORGE TOM CANNON, OF JOHANNESBURG, TRANSVAAL, SOUTH AFRICA.

ROPE-GRIP OR JOCKEY FOR MECHANICAL HAULAGE AND THE LIKE.

1,092,137.  Specification of Letters Patent.  Patented Apr. 7, 1914.

Application filed December 26, 1913. Serial No. 808,896.

*To all whom it may concern:*

Be it known that I, GEORGE TOM CANNON, M. R. C. V. S., a subject of the King of Great Britain, and resident of Johannesburg, Province of Transvaal, Union of South Africa, have invented certain new and useful Improvements in Rope-Grips or Jockeys for Mechanical Haulage and the like, of which the following is a specification.

This invention relates to a jockey or rope-grip for use in mechanical haulages for detachably connecting a truck or like vehicle to the haulage rope, of the kind comprising a rotatable grooved gripping member and a rigid gripping member between which the haulage rope is gripped.

The object of the present improvements is to render a jockey or grip of the kind referred to more reliable in operation, and to that end the invention consists in either so constructing one or both of the gripping parts that the release or disengagement of the haulage rope by said members—when said haulage rope is upwardly inclined for that purpose—is facilitated, and the possibility of derailment of the truck or other vehicle thereby reduced to a minimum; or in the provision of means for preventing the drag or frictional contact of the hauling rope with the lower portion of the rotatable gripping member from preventing the release of the rope by impeding the rotation of said member when the rope is inclined in an upward direction to cause said rope to be released and to maintain the rope at such an angle or inclination to the horizontal, where it passes between the rotatable and rigid gripping members of the jockey, that accidental reëngagement of the rope and jockey is avoided; or in a combination of both of the above features.

The invention consists either in constructing one, (preferably the rotatable grooved gripping member) of the parts between which the rope is gripped in such a way that the rope, when upwardly inclined, can lift said member or move it outwardly away from the other gripping member, and so permit the free disengagement of the rope from between the gripping members; or (whether one of the gripping parts be or be not adapted to lift or move outwardly) in providing the jockey or grip with a projection, part or member at the back (relative to the direction of travel), or, in the case of a reversible jockey or one designed to work both ways, at both the front and back; said projection, part or member being positioned in line with the opening which is formed between the rotatable grooved gripping member and the rigid gripping member in which opening the rope is gripped.

The invention will be more fully described with the aid of the accompanying drawings wherein—

Figure 3:
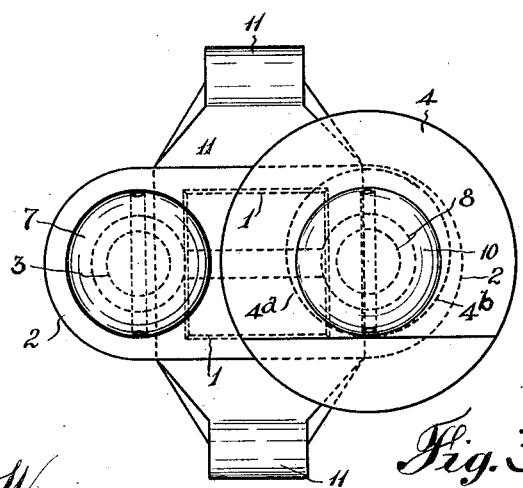
Figures 4, 5:
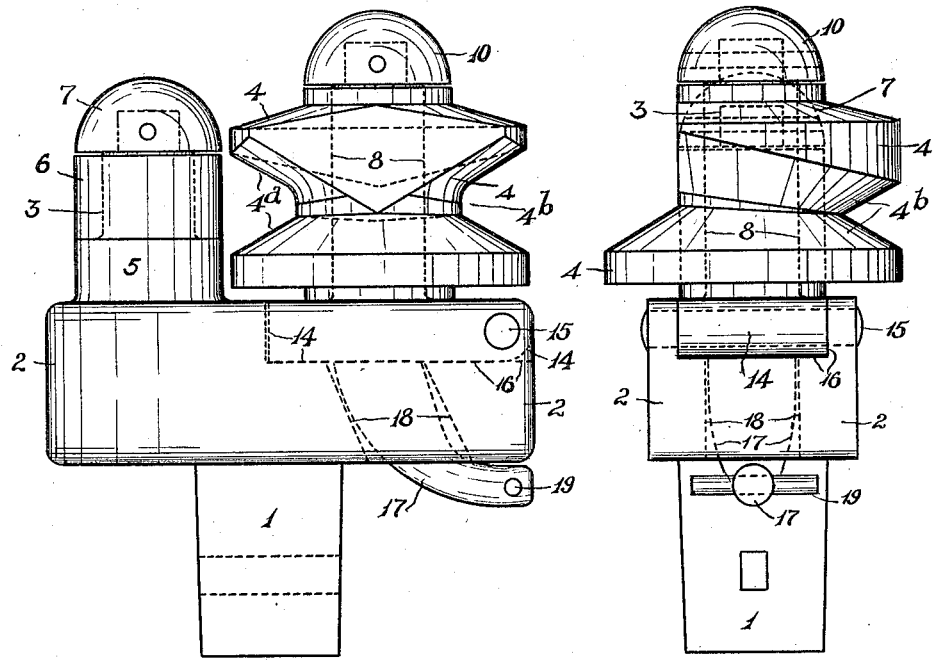

Figure 1 is a side elevation of one form of the jockey or rope-grip embodying both features of the invention, Fig. 2 being an elevation at right angles to Fig. 1 and Fig. 3 a plan. Fig. 4 is a side elevation of an alternative construction of the jockey illustrating a modification of the first feature of the invention. Fig. 5 is a view at right angles to Fig. 4 and Fig. 6 a plan.

Referring more particularly to the construction illustrated in Figs. 1 to 3, 1 represents the stem, spindle or other suitably shaped piece which is rotatably or otherwise attached, in any ordinary or convenient manner, to the truck or vehicle. The stem, spindle or piece 1 is suitably constructed to form at or in proximity to its upper end the cross-piece or base portion 2 on which is provided in the requisite relative positions the rigid gripping member 3 and the rotatable grooved gripping member 4. The pin or projection 3 which forms the rigid gripping member or a part thereof may be constructed at the bottom above the base 2 with a boss or enlarged portion 5. Around the pin 3 above said boss or enlarged portion 5 is arranged a preferably rotatable sleeve 6—instead of a rotatable sleeve 6 a non-rotatable piece may be provided on the pin 3 and either completely encircle the pin or cover it only on the inside or opposite the rotatable gripping member 4, or the pin 3 may be used alone and be directly engaged by the rope. The pin 3 above the sleeve 6 or its equivalent is preferably reduced to receive a cap 7 which may as shown be pinned thereon, or screwed or otherwise fixed thereto. The cap or its equivalent 7 serves to retain the sleeve 6 in position on the pin 3. This portion—that is to say, those parts forming the rigid member of the jockey—is preferably reduced in length as compared with the known constructions. The other pin or projection 8, on which the rotatable gripping member 4 is arranged, exceeds the pin 3 of the non-rotatable member in length. The rotatable gripping member 4 is constructed in the known manner with oppositely inclined helical grooves 4ᵃ, 4ᵇ and it is mounted on its pin 8 in such a way that the rope is gripped between it and the rotatable sleeve 6 of the rigid gripping member.

Encircling the pin 8 above the rotatable gripping roller or member 4 there is preferably arranged a helical or other suitable spring 9, and on the preferably reduced upper end of the pin 8 above said spring 9 a cap or its equivalent 10 is pinned (as shown), screwed or otherwise fixed to the end of said pin.

A ball or other suitable bearing may be interposed between the cap 10 or its equivalent and a washer with which the upper end of the spring 9 will engage or a similar bearing may be interposed between a washer and the top of the gripping roller 4 or between the cap 10 and roller 4 and washers at both ends of the spring. With this construction the rotatable gripping member 4 can be moved against the spring 9 by the action of the haulage rope when it is upwardly inclined. This upward movement of the rotatable gripping member 4 will allow the rope to pass freely out of the helical groove and from between the gripping roller 4 and the sleeve 6 of the rigid gripping member.

As the weight of the rope tends to keep the rotatable gripping member 4 in its lowermost position on the pin 8, it may be found possible to dispense with the spring 9, but in this event the pin 9 must be of a sufficient length to permit the gripping member 4 to be lifted by the haulage rope when the latter is upwardly inclined.

In connection with Figs. 1, 2 and 3 I also illustrate that feature which consists in providing the jockey or grip with a projection, part or member at the back, or both front and back when the jockey or grip is reversible. 11 denotes the said projection, part or member which is shown provided at both the back and front of the jockey. The member 11 is shown arranged upon the stem or spindle 1, the latter being of square shape in cross-section and the hole in the member 11 of corresponding shape which insures said member being kept in its correct position relative to the rotatable and rigid gripping members. The arms of the member 11 project upwardly and outwardly as shown in Figs. 2 and 3 and they are of such a length that their upper ends (which are preferably curved outwardly and downwardly to prevent damage to the rope), are approximately on a level with the beveled or inclined lower portion 12 of the rotatable gripping member 4. That arm of the member 11, which is at the back relative to the direction of travel of the jockey, prevents the haulage rope dragging upon or having frictional contact with the lower portion 12 of the revoluble gripping member to such an extent that when the said rope is upwardly inclined, it causes the release of the rope from the jockey. When the rope is so inclined it comes into contact with the helically grooved portion 13 of the rotatable gripping member 4 which is free to revolve to allow of the disengagement of the rope, the member 11 at the back of the jockey serving as a rest for the rope and preventing the inclined rope from rotating the member 4 beyond the point of release of the rope. The member 11 may be fixed to any other suitable part or parts of the jockey, or it may be constructed integral therewith. It may be constructed of any other suitable shape as for example in the form of a right angle piece.

The arm or arms of the member 11, as seen more particularly in Figs. 1 and 3, are of a sufficient width to extend or span across the opening provided for the rope between the rotatable gripping member 4 and the sleeve 6 of the rigid gripping member 3.

If desired the upper end of the member 11 may be grooved or shaped to receive a portion of the rope.

Instead of providing the member 11 on the jockey proper, said member may be provided upon the bracket or support in which the jockey is carried, or it may be attached to the pan or truck body in any suitable manner so long as its upper end assumes the position previously described relative to the rotatable gripping members of the jockey. The member may be constructed in one piece with the bracket or other part of the truck or vehicle or be a separate part and fixed thereto in any convenient manner.

The preferred form of the device is that shown in Figs. 1 to 3, either with or without the spring 9; that is to say it is preferred to make the rotatable gripping member 4 so that it can be lifted upon its pin 8 by the inclined hauling rope and also to employ in combination with it the member 11.

Figure 6:
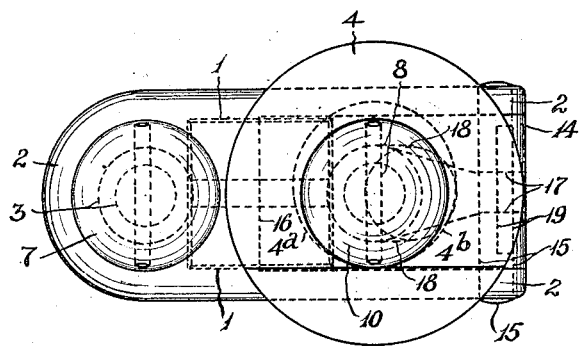

In the modified form of the invention illustrated in Figs. 4 to 6, the pin 8 upon which the gripping roller 4 is rotatably mounted may be constructed in one piece with or be suitably attached to a part 14 which is hinged along its outer edge or side to the base 2; 15 being the hinge pin. The part 14 which carries the gripping roller pin or spindle 8 may be shaped to fit a recess 16 in the top of the base portion 2. 17 is a curved projection formed upon the bottom of part 14 which projection 17 passes through a hole 18 formed in the base portion 2. 19 is a pin which is fixed in the end of the projection 17 beneath the bottom of the base portion 2. The pin 19 on projection 17 by engaging the bottom of the base portion 2 prevents the pin 8 and the griping roller 4 from being moved about the hinge pin 15 beyond a predetermined amount, which is sufficient to permit of the disengagement of the haulage rope from the jockey. If desired the hinged base portion 14 of the construction shown in Figs. 4 to 6 may be combined with a suitable spring arrangement for keeping the parts in their normal position and for resisting unintentional movement of the hinged parts.

What I claim as my invention and desire to protect by Letters Patent is:—

1. A jockey or rope-grip comprising a rotatable gripping member and a rigid gripping member, the rotatable gripping member being adapted to be lifted by the haulage rope to permit the latter to pass from between the gripping members as set forth.

2. A jockey or rope-grip comprising a rotatable gripping member, a rigid gripping member and a sleeve rotatably mounted upon said gripping member opposite the rotatable gripping member, the rotatable gripping member being adapted to be lifted by the haulage rope to permit the latter to pass from between the gripping members as set forth.

3. A jockey or rope-grip comprising a rotatable gripping member, a rigid gripping member and a spring arranged above the rotatable gripping member, said rotatable gripping member being adapted to be lifted against the spring by the haulage rope to permit the latter to pass from between the gripping members as set forth.

4. A jockey or rope grip comprising a base portion, a pin or projection on said base portion a gripping roller rotatably mounted upon said pin or projection, said pin or projection being of such a length as to allow the gripping roller to be lifted by the inclined haulage rope to a sufficient extent to permit the rope to disengage the grip or jockey and a rigid gripping member between which and the rotatable gripping member the rope is gripped.

5. A jockey or rope-grip comprising a base portion, a pin or projection on said base portion a gripping roller rotatably mounted upon said pin or projection, a spring arranged on said pin or projection above the gripping roller, means for retaining said spring in position, said pin or projection being of such a length as to allow the gripping roller to be lifted by the inclined haulage rope to a sufficient extent to permit the rope to disengage the grip or jockey and a rigid gripping member between which and the rotatable gripping member, the rope is gripped.

6. A jockey or rope-grip comprising a pair of gripping members one of which is grooved and adapted to be rotated into a disengaging position by the contact with it of the hauling rope when said rope is upwardly inclined, and a member arranged at the back of said gripping members and in line with the opening which is provided between said gripping for the rope, said members serving as a rest for the rope at the back of the gripping members when said rope is upwardly inclined thereby preventing the rotatable gripping member from being rotated beyond the point of release or to a sufficient extent to cause the rope to be reëngaged by the jockey or rope grip.

7. A jockey or rope-grip comprising a pair of gripping members one of which is adapted to be lifted by the hauling rope to permit said rope to pass from between the gripping members and a member arranged at the back of said gripping members and in line with the opening which is provided between said gripping members for the rope, said member serving as a rest for the rope at the back of the gripping members when said rope is upwardly inclined, thereby preventing the rotatable gripping member from being rotated beyond the point of release or to a sufficient extent to cause the rope to be reëngaged by the jockey or rope grip.

In testimony whereof I have signed my name to this specification in the presence of two subscribing witnesses.

GEORGE TOM CANNON.

Witnesses:
   CHAS OVENDALE,
   A. THOMPSON.

---

Copies of this patent may be obtained for five cents each, by addressing the "Commissioner of Patents, Washington, D. C."